Patented Sept. 16, 1952

2,610,900

UNITED STATES PATENT OFFICE 2,610,900

PIPELINE TRANSPORTATION OF SOLID MATERIALS AND PETROLEUM PRODUCTS

Walter M. Cross, Jr., Kansas City, Mo., assignor to Kansas City Testing Laboratory, Kansas City, Mo., a corporation of Missouri No Drawing. Application February 13, 1948, Serial No. 8,296

16 Claims. (Cl. 302—66)

This invention relates to the simultaneous transportation by pipeline of a liquid petroleum product and granules of one or more solid materials. This application is a continuation in part of my copending application entitled "Pipeline Transportation of Solid Materials," Serial Number 8,297 filed February 13, 1948 and "Pipeline Transportation of Soluble Granular Materials," Serial Number 8,295, filed February 13, 1948.

As mentioned in more detail in the aforementioned application, the cost of shipping solid materials by conventional means is often excessive. This is particularly true of the transportation of certain materials, such as potash, soda ash, sodium sulphate, sodium chloride, phosphate rock, iron ore, coal, fuller's earth, etc., which are mined in the southwestern part of the United States. Fortunately, however, many of these materials are mined in localities adjacent to regions in which petroleum products are recovered. By means of my invention it is now possible to take advantage of the contiguity of mining and petroleum industries, when it occurs, by simultaneously shipping the products of each through a pipeline and thus reducing the total transportation costs.

In order to do this my invention provides a method of transportation wherein the petroleum product is utilized as a suspension medium for granules of solid material. This mixture may be easily forced through a pipeline to a desired destination where the products may be separated. A special aspect of the invention contemplates the control of the rate of settling of the granules by regulating their size and/or the viscosity of the petroleum product. Control of the rate of settling is particularly desirable because as this rate is decreased so is the required velocity of the transporting medium, thus resulting in appreciable reductions in pumping costs. The invention is, therefore, especially useful for long distance transportation of materials.

The principle of this invention may be considered from the standpoint of Stoke's law regarding the force of liquid friction. The mathematical representation of this law is:

$$F = knav$$

where $F$ = force of liquid friction on particles falling in a liquid due to the force of gravity.
$k$ = a constant
$n$ = viscosity of the medium
$a$ = radius of the particles
$v$ = velocity of the particles falling in the medium.

This formula shows that viscosity, particle size, and velocity are interdependent so that modification of any factor affects those remaining.

When a liquid is being forced through a pipeline at velocities high enough to cause turbulent flow, the required amount of support to prevent settling of particles suspended therein is less than when the flow is nonturbulent. This is due to the agitation and stirring action in the pipeline which tends to keep the particles in suspension. Pumping costs increase with velocity, however, so that this method of preventing settling may be unnecessarily expensive. I contemplate a more economical method which takes advantage of the relationships illustrated in the Stoke's formula. Thus, the viscosity and particle size can be regulated to reduce velocities of settling. In a vertical pipe, for example, an upward velocity of the mixture of liquid and granules high enough to overcome $v$ in the formula is all that is necessary to transport the material upwardly. In horizontal transportation, the critical velocity may actually be somewhat less than that indicated by the formula due to a certain amount of turbulence caused by increased friction of the particles settling to the bottom of the pipe. To obtain lowest pumping costs, increased particle size relative to particle weight may be employed to decrease the critical velocity. In general, it is preferable to increase viscosity, particularly if the medium is of a lubricant type, since this permits the transportation of a higher concentration of solid particles.

Several examples of the invention will now be referred to so that it may be conveniently described in more detail. It will be understood, however, that these are merely illustrative of the various modifications which may be made of the invention.

Example 1

According to this example, the rate of settling is controlled by regulating the particle size of the solid material which is suspended in the liquid petroleum product. A typical analysis of a fluid mixture is as follows:

| | Parts (by weight) |
|---|---|
| Oil | 65 |
| Potassium chloride crystals | 35 |

While it will be understood that the oil may have any physical characteristics which, in the opinion of one practicing the invention, fit it for flow through a pipeline, for the proportions cited it preferably has a Baumé gravity of 20 and, at 70° F., a Saybolt Universal viscosity of 3000 seconds. Both the specific gravity and the viscosity of the oil affect the rate of settling of the potash crystals. As the value of viscosity increases and as the value of Baumé gravity decreases, the rate of settling decreases. The crystal size, because of its effect on the ratio of surface area to crystal weight, also affects the rate of settling. As crystal size decreases the rate of settling decreases.

In the present example, the specific gravity and viscosity of the oil are fixed, hence, it is necessary to control the rate of settling by means of the crystal size. I have found that a desirable maximum rate of settling is one foot per minute, though this may be increased or decreased depending upon particular circumstances. By conducting laboratory observations of the rate of settling of various size crystals of potash in the above described oil, it is possible to determine the required crystal size. In the present case, crystals of potash which pass a 100 mesh screen will have a settling rate of less than one foot per minute. Thirty-five parts of crystals of this size are then mixed with sixty-five parts oil and the mixture forced through a pipeline. At the terminus the crystals may be filtered out of the oil, or otherwise suitably separated. The separated products are then prepared for individual disposal according to commercial dictates.

A mixture of thirty-five parts of potassium chloride crystals and sixty-five parts of oil by weight will give a fluid or slurry weighing 9.6 pounds per gallon. This mixture will have a volume approximating twenty-one barrels per ton of potassium chloride transported. It may often be preferable to make the crystals somewhat smaller so that equal parts of oil and potassium chloride can be pumped and a thinner oil used. A mixture of this type will have a volume of about 12.5 barrels per ton of potassium chloride transported. The cost of transporting the mixture is only a little more than that of transporting the oil alone. Since the potassium chloride occupies about one third of the volume of oil, it is obvious that the total transportation costs can be materially reduced and considerable savings obtained.

The particle size of the solid material may be varied by any suitable means. Generally, this will be mechanical such as pulverizing or grinding machines. However, in hot well mining operations it is possible to control crystal size by means of the rate of recrystallization. In the foregoing example this would be the preferred method for regulating the size of the potash crystals.

Example 2

According to this example the viscosity of the petroleum product is varied by the addition of suitable materials such as the metallic soaps (copper stearate, aluminum stearate, etc.). This is a particularly useful method for controlling the rate of settling when thin petroleum products such as gas oil or distillate are to be transported and used as the suspending medium for solid particles. The particle size may also be varied along with the viscosity until observations of the rate of settling indicate that the liquid medium is capable of satisfactorily suspending the particles. As indicated, this is generally at rates of one foot per minute or less. After a desired mixture of oil, soap, and granules, is prepared it may be forced through a pipeline and the individual ingredients recovered by suitable methods employed in the arts.

A typical mixture according to this example is as follows:

| | Parts (by weight) |
|---|---|
| Oil | 63 |
| Stearate | 2 |
| Potash crystals (KCl) | 35 |

Initially this oil had a Saybolt viscosity of 200 seconds. After the metallic soap was added, the specific gravity remained about the same and the viscosity was 3200 seconds Saybolt Universal. The potash crystals passed a 100 mesh screen and had a rate of settling of 0.1 foot per minute.

Example 3

According to this example, the petroleum product is emulsified in a controlled manner so that the resulting emulsion has a viscosity capable of supporting the granules to be transported. Methods of and agents for preparing such emulsions are well known and it is therefore possible to produce liquid suspension mediums having variable viscosities. These viscosities can be controlled in conjunction with particle size to produce the desired rates of settling.

A particularly valuable modification of this example contemplates the preparation of an emulsion of the petroleum product and water solution of a solid material to be transported. This material and the petroleum product can be separated by suitable means at the pipeline terminus.

A specific illustration of this modification is as follows:

| | |
|---|---|
| Oil | 60 parts (by weight) |
| Water | 40 |
| Potash (KCl) | 14 (in solution) |
| Potash (KCl) crystals | 20 |

The potash (1) forms a saturated solution in water at about 70° F. This brine is mixed with the oil and an emulsifying agent added to make the emulsion permanent. Such an agent might be of the following analysis:

| | |
|---|---|
| Vinsol resin | 1 part (by weight) |
| Red oil | 1-½ parts |
| 4% solution sodium hydroxide. | Parts sufficient to saponify red oil and resin. |

If this agent is mixed with the brine and oil, an emulsion is formed having a viscosity of approximately 2000 Saybolt Universal seconds and Baumé gravity of about 10. The twenty parts of potash crystals, 200 mesh screen, may be added to the emulsions and the resulting mixture forced through the pipeline. At the terminus the valuable ingredients may be separated by conventional methods. Obviously, solid particles other than potash crystals or in addition to these crystals may be incorporated in the mixture.

Another method of increasing viscosity that is very often advantageous is to dissolve a gelling agent in the oil to form a colloidal solution. Such an agent is asphalt having perhaps 70 to 90% asphaltenes which have good colloidal suspension characteristics as dispersed in the petrolene content of the asphalt and also when the asphalt is dissolved in certain solvents such as benzol or toluol. Asphalt of this type is more soluble in oils of comparatively high naphthenic or aromatic content and least soluble in oils of high paraffinic content. With either type of oil, sufficient asphalt should be dissolved to obtain the desired viscosity, preferably a Saybolt Universal of about 1000 to 3000 seconds, in accordance with the principles set forth above. One formula illustrating this modification with a typical West Texas heavy oil is as follows:

| | Parts (by weight) |
|---|---|
| Oil | 60 |
| Potash (KCl) | 30 |
| Asphalt | 10 |

It is preferable to mix the oil and asphalt while hot to facilitate preparation of the gel.

In many cases it is useful to stir or agitate the mixture as it passes through the pipeline. This tends to keep the solid particles in suspension and therefore permits a higher rate of settling to be used. Particularly effective agitating is achieved by rifling the pipes. It is also possible to include conventional scraping devices, such as are used in cleaning pipelines, at intervals in the pipeline to pick up any settlings. As pointed out above the velocity of flow through the pipe also affects the rate of setting because of its effect on agitation. If there is a minimum velocity of flow through the pipeline, as determined by factors outside of this invention, it may be possible to reduce the viscosity of the carrier liquid well below the preferred ranges set forth above. For example, a liquid having a viscosity of only 60 seconds, Saybolt Universal, will suspend crystals of 200 mesh size when traveling at a velocity of seven feet per second.

If desired, it is, of course, possible to control the pH of the mixture so as to inhibit corrosion of the pipes by the addition of suitable agents or inhibitors such as mentioned in the aforesaid copending applications.

It will be understood that the foregoing illustrations do not define the scope of the invention as this is determined by the following claims.

I claim:

1. The method of simultaneously transporting a normally liquid petroleum product and granules of water soluble solid material which comprises mixing the product and an aqueous brine containing said granules, controlling the rate of settling of the granules in the product, forcing the mixture through a pipeline, and separating the material and product.

2. The method of simultaneously transporting a normally liquid petroleum product and granules of water soluble solid material which comprises preparing a mixture of the product and an aqueous brine containing said granules in which the granules have a predetermined maximum rate of settling of substantially one foot per minute, forcing the mixture through a pipeline, and separating the material and product.

3. The method of simultaneously transporting a normally liquid petroleum product of predetermined viscosity and granules of water soluble solid material which comprises adjusting the granule size of the material in an aqueous brine so that the granules have a predetermined rate of settling in the liquid product, mixing the product and said aqueous brine containing said granules, forcing the mixture through a pipeline, and separating the material and product.

4. The method of simultaneously transporting a normally liquid petroleum product and granules of water soluble solid material of predetermined size which comprises adjusting the viscosity of the product so that the granules have a predetermined rate of settling therein, mixing the product and an aqueous brine containing said granules, forcing the mixture through a pipeline, and separating the material and product.

5. The method of simultaneously transporting a normally liquid petroleum product and granules of water soluble solid material which comprises adjusting the granule size of the material in an aqueous brine and adjusting the viscosity of the product so that the granules have a predetermined rate of settling in the product, mixing the product and material, forcing the mixture through a pipeline, and separating the material and product.

6. The method of simultaneously transporting a normally liquid petroleum product and granules of water soluble solid material which comprises preparing a mixture of product, water, and material in which the granules have a predetermined rate of settling, forcing the mixture through a pipeline, agitating the mixture within the pipeline, and separating the material and product.

7. The method of simultaneously transporting a normally liquid petroleum product and granules of water soluble solid material which comprises preparing an emulsion of the product and water having a predetermined viscosity, mixing the granules and emulsion, forcing the mixture through a pipeline, and recovering at least the material from the mixture.

8. The method of simultaneously transporting a normally liquid petroleum product and water soluble material which comprises preparing an emulsion of the product and a water solution of the material, forcing the emulsion through a pipeline, and recovering at least the material from the emulsion.

9. The method of simultaneously transporting a normally liquid petroleum product and a water soluble material which comprises preparing an emulsion of the product and a saturated water solution of the material, mixing the emulsion and granules of the material, forcing the mixture through a pipeline, and recovering at least the material from the mixture.

10. The method of simultaneously transporting a normally liquid petroleum product and a water soluble material which comprises preparing an emulsion of predetermined viscosity of the product and a saturated water solution of the material, said viscosity being determined so that granules of the material have a predetermined rate of settling therein, mixing the emulsion and granules of the material, forcing the mixture through a pipeline, and recovering at least the material from the product.

11. The method of simultaneously transporting a thin liquid petroleum product and granules of a water soluble solid material which comprises increasing the viscosity of the product by the addition thereto of a metallic soap, mixing the product and an aqueous brine containing said granules, forcing the mixture through a pipeline, and separating the material and product.

12. The method of simultaneously transporting a thin liquid petroleum product and granules of a water soluble solid material which comprises increasing the viscosity of the product by dissolving a gelling agent therein to form a colloidal solution, mixing the product and an aqueous brine containing said granules, forcing the mixture through a pipeline, and separating the material and the product.

13. The method of simultaneously transporting a thin liquid petroleum product and granules of a water soluble solid material which comprises increasing the viscosity of the product by dissolving therein an asphalt having a high colloidal asphaltene content, mixing the product and an aqueous brine containing said granules, forcing the mixture through a pipeline, and separating the material and product.

14. The method of simultaneously transporting a normally liquid petroleum product and granules of potassium chloride which comprises mixing the product and an aqueous brine containing said granules, controlling the rate of settling of the granules in the product, forcing the mixture through a pipe line, and separating the material and product.

15. The method of simultaneously transporting a normally liquid petroleum product and granules of potassium chloride which comprises preparing an emulsion of the product and water having a predetermined viscosity, mixing the granules and emulsion, forcing the mixture through a pipeline, and recovering at least the material from the mixture.

16. The method of simultaneously transporting a normally liquid petroleum product and potassium chloride which comprises preparing an emulsion of predetermined viscosity of the product and a saturated water solution of the potassium chloride, said viscosity being determined so that granules of potassium chloride have a predetermined rate of settling therein, mixing said emulsion and granules of potassium chloride, forcing the mixture through a pipeline, and recovering the potassium chloride from the product.

WALTER M. CROSS, Jr.

REFERENCES CITED

The following references are of record in the file of this patent:

UNITED STATES PATENTS

| Number | Name | Date |
|---|---|---|
| 1,091,251 | Stauffer | Mar. 24, 1914 |
| 1,329,967 | Greenstreet | Feb. 3, 1920 |
| 1,390,230 | Bates | Sept. 6, 1921 |
| 1,431,225 | Greenstreet | Oct. 10, 1922 |
| 2,042,428 | Krekeler | May 26, 1936 |
| 2,128,913 | Burk | Sept. 6, 1938 |
| 2,359,325 | McConnell | Oct. 3, 1944 |
| 2,421,968 | Schutte | June 10, 1947 |

OTHER REFERENCES

Page 170, Chemical Refining of Petroleum, Kalichwesky and Stagner, 2nd ed., 1942, published by Reinhold Publishing Corp.